(12) United States Patent
Matsubara et al.

(10) Patent No.: US 6,557,360 B2
(45) Date of Patent: May 6, 2003

(54) COMPRESSOR TORQUE COMPUTING METHOD, AIR-CONDITIONING SYSTEM AND ENGINE CONTROL APPARATUS

(75) Inventors: Ryo Matsubara, Kariya (JP); Ken Suitou, Kariya (JP); Kazuya Kimura, Kariya (JP); Masahiro Kawaguchi, Kariya (JP)

(73) Assignee: Kabushiki Kaisha Toyota Jidoshokki, Kariya (JP)

(*) Notice: Subject to any disclaimer, the term of this patent is extended or adjusted under 35 U.S.C. 154(b) by 0 days.

(21) Appl. No.: 10/104,865

(22) Filed: Mar. 22, 2002

(65) Prior Publication Data

US 2002/0166330 A1 Nov. 14, 2002

(30) Foreign Application Priority Data

Mar. 22, 2001 (JP) .......................... 2001-083347

(51) Int. Cl.⁷ .............. B60H 1/32; F25B 1/00
(52) U.S. Cl. .......................... 62/133; 62/229
(58) Field of Search ............. 62/133, 229, 228.5, 62/228.3, 210

(56) References Cited

U.S. PATENT DOCUMENTS

| 5,285,649 A | * | 2/1994 | Yamanaka et al. ............. 62/133 |
| 5,385,029 A | * | 1/1995 | Yamanaka et al. ............. 62/133 |
| 5,924,296 A | | 7/1999 | Takano et al. ................. 62/133 |
| 6,484,520 B2 | * | 11/2002 | Kawaguchi et al. ........... 62/133 |
| 2002/0100285 A1 | * | 8/2002 | Baruschke et al. ............ 62/133 |
| 2002/0157410 A1 | * | 10/2002 | Suitou et al. ............... 62/228.3 |

FOREIGN PATENT DOCUMENTS

EP   1 066 997 A2   1/2001   ............ B60H/1/32

* cited by examiner

Primary Examiner—Denise L. Esquivel
Assistant Examiner—Marc Norman
(74) Attorney, Agent, or Firm—Morgan & Finnegan, LLP

(57) ABSTRACT

An air conditioning apparatus includes a refrigerant circulation circuit that has a compressor. A driving status of the compressor is detected by first detector. A first calculator calculates a theoretical torque and a driving efficiency of the compressor based on information from the first detector. A second calculator calculates a necessary torque required for driving the compressor. The second calculator calculates the necessary torque based on the theoretical torque.

10 Claims, 2 Drawing Sheets ced view of a variable displacement swash plate type compressor; and

COMPRESSOR TORQUE COMPUTING METHOD, AIR-CONDITIONING SYSTEM AND ENGINE CONTROL APPARATUS

BACKGROUND OF THE INVENTION

1. Field of the Invention

The present invention relates to an air-conditioning system which has a capability of computing torque needed to drive a compressor.

2. Description of the Related Art

To suitably control the power of the engine of a vehicle, the torque necessary to drive a compressor which uses the engine as its drive source has generally been computed. For example, the actual torque needed is computed based on the theoretical torque which is theoretically needed for the current drive of the compressor and the loss torque which needs to be considered due to friction or the like in the compressor, and the engine power is controlled based on the computed torque.

Although the loss torque of a compressor differs depending on the operational state of the compressor, it has been treated as a constant value so far without considering the fact. It is therefore unable to accurately compute the torque of a compressor and eventually control the engine power with high precision.

While there is an idea of directly detecting the torque of a compressor by using a torque sensor, the sensor is expensive and requires a large mounting space so that the idea is not practical.

SUMMARY OF THE INVENTION

Accordingly, it is an object of the present invention to provide an air-conditioning system capable of accurately computing torque needed to drive a compressor.

(It is another object of the present invention to provide an apparatus for engine control that can accurately compute the torque of an engine which drives a compressor, in accordance with a change in the torque needed to drive the compressor.)

According to one aspect of the present invention, an air conditioning apparatus is provided. The apparatus includes a coolant circuit that has a compressor. A driving status of the compressor is detected by a first detecting means. The apparatus has a first calculating means and a second calculating means. The first calculating means calculates a theoretical torque and a driving efficiency of the compressor based on information from the first detecting means. The second calculating means calculates a necessary torque required for driving the compressor. The second calculating means calculates the necessary torque based on the theoretical torque.

According to another aspect of the present invention, an apparatus is provided. The apparatus controls an engine that is a driving source of a vehicle and an air conditioner mounted on the vehicle. The apparatus comprises the first detecting means, the first calculating means, the second calculating means, and a control means. The first detecting means detects a driving status of the compressor. The first calculating means calculates a theoretical torque and a driving efficiency of the compressor based on information from the first detecting means. The second calculating means calculates a torque required for driving the compressor. The second calculating means calculates the necessary torque based on the theoretical torque. The control means controls the engine reflecting the torque calculated by the second calculating means.

DETAILED DESCRIPTION OF A PREFERRED EMBODIMENT

The present invention will now be described referring to the accompanying drawings.

Figure 1:
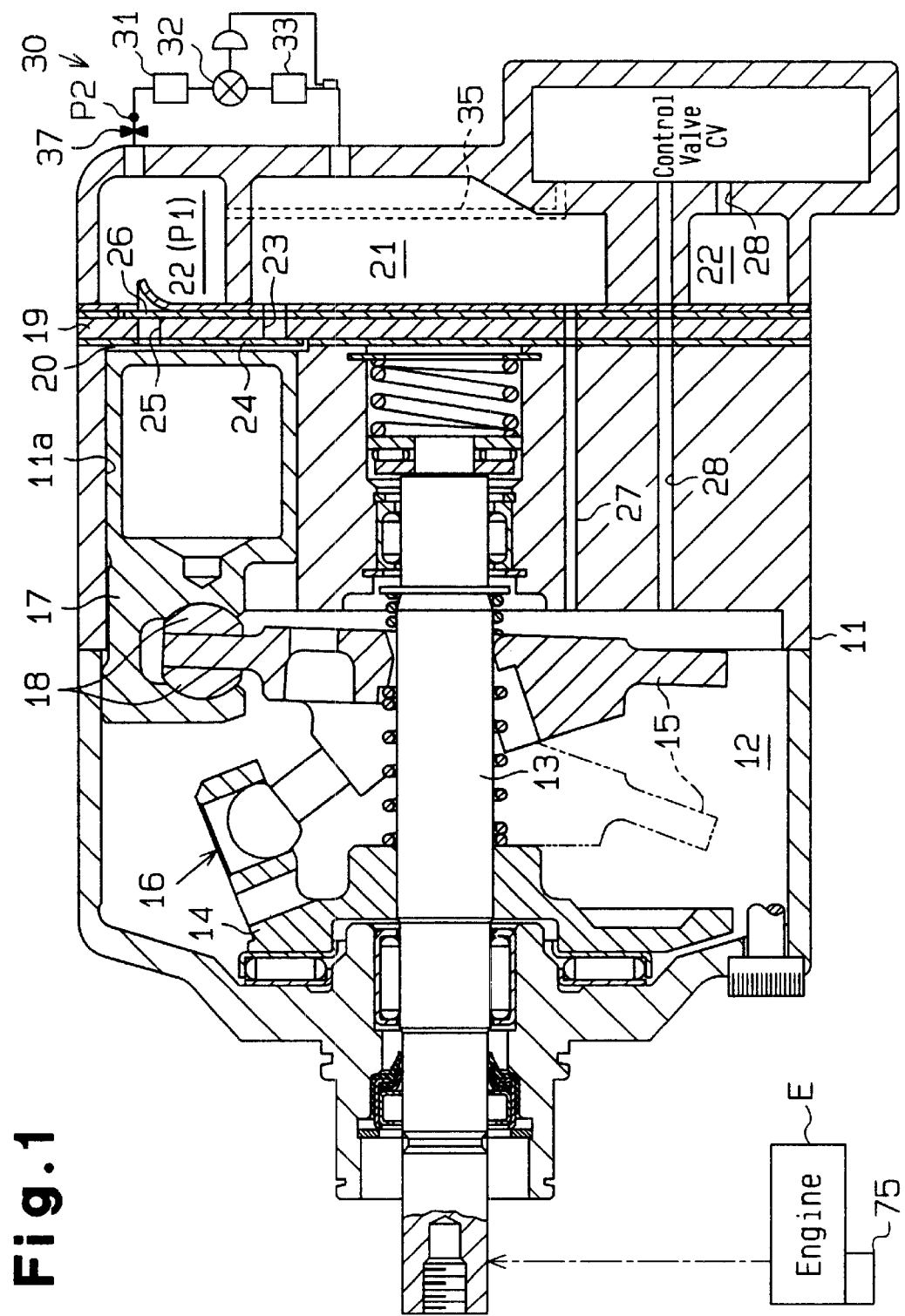
FIG. 1 is a cross-sectional view of a variable displacement swash plate type compressor.

As shown in FIG. 1, a crank chamber 12 is defined in a housing 11 of a variable displacement swash plate type compressor. A drive shaft 13 is placed rotatably in the crank chamber 12. The drive shaft 13 is operationally coupled to an engine E which is the drive source for running of a vehicle and is rotated by the power supplied from the engine E.

A lug plate 14 is fixed on the drive shaft 13 in the crank chamber 12 in such a way as to be rotatable together with the drive shaft 13. A swash plate 15 is retained in the crank chamber 12. The swash plate 15 is supported on the drive shaft 13 in such a way as to be slidable and variably inclined. A hinge mechanism 16 is intervened between the lug plate 14 and the swash plate 15. Through the hinge mechanism 16, therefore, the swash plate 15 can rotate in synchronism with the lug plate 14 and the drive shaft 13 and can tilt with respect to the drive shaft 13.

A plurality of cylinder bores 11a (only one shown) are formed in the housing 11 and single-headed pistons 17 are disposed in a reciprocative manner in the respective cylinder bores 11a. Each piston 17 is attached to the outer peripheral portion of the swash plate 15 via a pair of shoes 18. Therefore, the rotational motion of the swash plate 15 that is originated from the rotation of the drive shaft 13 is converted to the reciprocation of each piston 17 via the shoe 18.

Defined in each cylinder bore 11a at the rear side (rightward in the diagram) is a compression chamber 20 which is surrounded by the piston 17 and a valve plate assembly 19 disposed in the housing 11. A suction chamber 21 and a discharge chamber 22 are defined in the housing 11 at places further back of the valve plate 19.

As each piston 17 moves to the bottom dead center from the top dead center, a refrigerant gas in the suction chamber 21 is fed into the compression chamber 20 via an suction port 23 and an suction valve 24 both formed in the valve plate 19. The refrigerant gas that is fed into the compression chamber 20 is compressed to a predetermined pressure by the movement of the piston 17 to the top dead center from the bottom dead center and is discharged to the discharge chamber 22 via a discharge port 25 and a discharge valve 26 both formed in the valve plate 19.

A bleeding passage 27 and a supply passage 28 are provided in the housing 11. The bleeding passage 27 connects the crank chamber 12 to the suction chamber 21. The air-supply passage 28 connects the discharge chamber 22 to the crank chamber 12. A control valve CV is disposed in the air-supply passage 28 in the housing 11.

The balance between the amount of a high-pressure discharge gas supplied into the crank chamber 12 via the air-supply passage 28 and the amount of a gas led out from the crank chamber 12 via the bleeding passage 27 is controlled by adjusting the degree of opening of the control valve CV. The balance determines the inner pressure of the crank chamber 12, which acts as a control chamber. In accordance with a change in the inner pressure of the crank chamber 12, the difference between the inner pressure of the crank chamber 12 and the inner pressure of the compression chamber 20 via the piston 17 is changed, thereby changing the inclination angle of the swash plate 15. As a result, the stroke of the piston 17 or the discharge capacity of the compressor is adjusted.

When the inner pressure of the crank chamber 12 drops, for example, the inclination angle of the swash plate 15 increases, thereby making the discharge capacity of the compressor larger. When the inner pressure of the crank chamber 12 rises, on the other hand, the inclination angle of the swash plate 15 decreases, thereby reducing the discharge capacity of the compressor.

As shown in FIG. 1, a refrigerant circulation circuit (refrigeration cycle) of a vehicular air-conditioning system comprises the above-described compressor and an external refrigeration circuit 30. The external refrigeration circuit 30 has a condenser 31, an expansion valve 32 as a decompressor and an evaporator 33.

A first pressure monitor point P1 is set in the discharge chamber 22. A second pressure monitor point P2 is set in the refrigerant passage apart from the first pressure monitor point P1 toward the condenser 31 (downstream side) by a predetermined distance. The first pressure monitor point P1 and the control valve CV are connected via a first pressure detection passage 35. The second pressure monitor point P2 and the control valve CV are connected via a second pressure detection passage 36 (see FIG. 2). A fixed restrictor 37 is provided on the refrigerant passage between the first pressure monitor point P1 and the second pressure monitor point P2.

Figure 2:
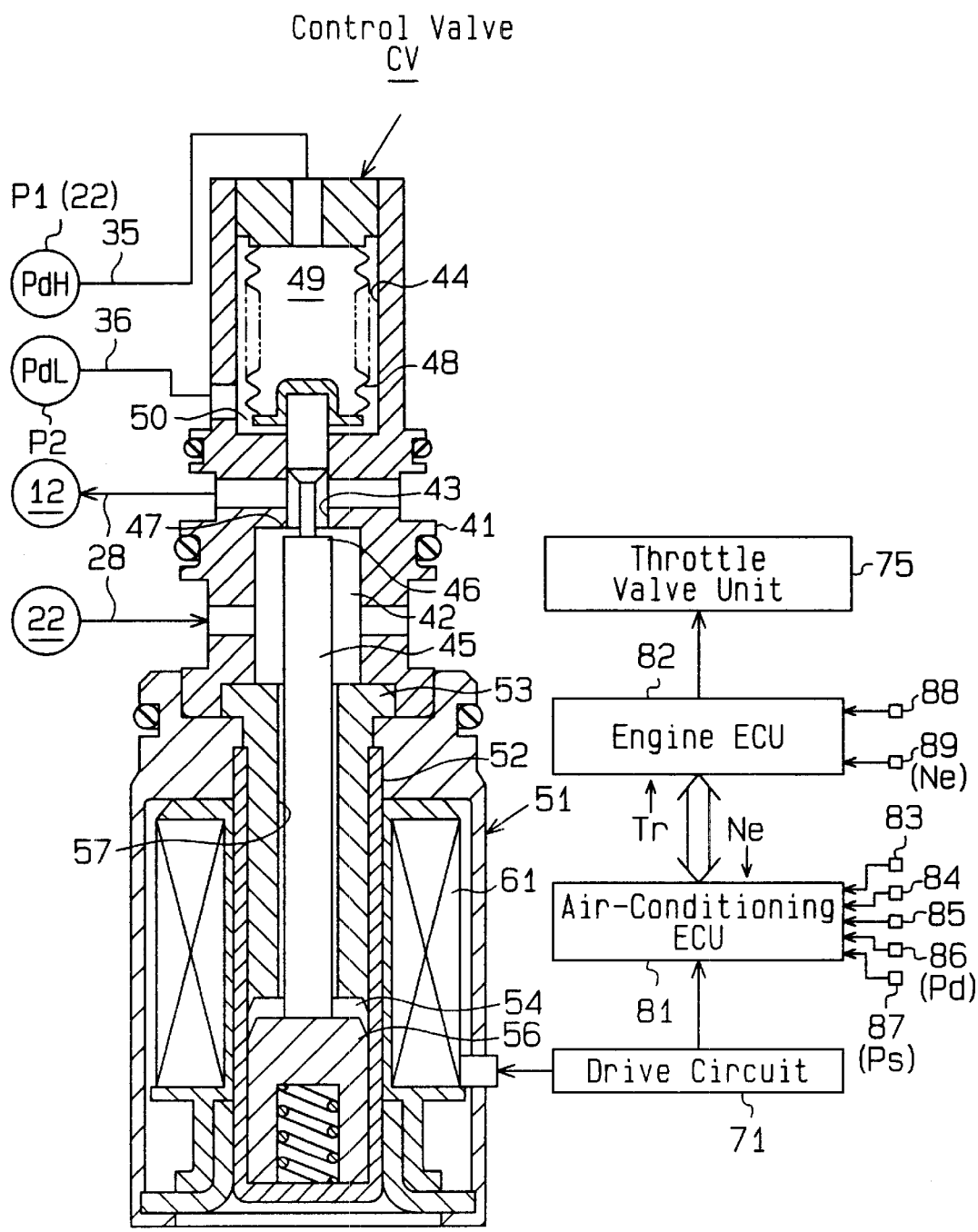
FIG. 2 is a cross-sectional view of a control valve.

As shown in FIG. 2, a valve chamber 42, a communication passage 43, and a pressure detection chamber 44 are defined in a valve housing 41 of the control valve CV. A rod 45 is placed in the valve chamber 42 and the communication passage 43 in such a way as to be movable in the axial direction (the vertical direction in the diagram).

The communication passage 43 and the pressure detection chamber 44 are shielded from each other by the upper end portion of the rod 45 inserted in the communication passage 43. The valve chamber 42 is connected to the discharge chamber 22 via the upstream portion of the air-supply passage 28. The communication passage 43 is connected to the crank chamber 12 via the downstream portion of the air-supply passage 28. The valve chamber 42 and the communication passage 43 constitute a part of the air-supply passage 28.

A valve body 46 formed at a middle portion of the rod 45 is placed in the valve chamber 42. The step that is positioned at the boundary of the valve chamber 42 and the communication passage 43 constitutes a valve seat 47 and the communication passage 43 serves as a sort of a valve hole. As the rod 45 moves from the position in FIG. 2 (the lowest movable position) to the highest movable position where the valve body 46 sits on the valve seat 47, the communication passage 43 is blocked. That is, the valve body 46 regulates the degree of opening of a control passage, in this case the air-supply passage 28.

A bellows 48 is retained in the pressure detection chamber 44. The upper end portion of the bellows 48 is fixed to the valve housing 41. The upper end portion of the rod 45 is fitted into the lower end portion (movable end) of the bellows 48 which has a bottomed cylindrical shape. The inner space of the chamber 44 is defined into a first pressure chamber 49 (or the inner space of the bellows 48) and a second pressure chamber 50 (or the outer space of the bellows 48) by the bellows 48. A pressure PdH at the first pressure monitor point P1 is led into the first pressure chamber 49 via the first pressure detection passage 35. A pressure PdL at the second pressure monitor point P2 is led into the second pressure chamber 50 via the second pressure detection passage 36.

An electromagnetic actuator 51 is provided at the lower portion of the valve housing 41. The actuator 51 has a bottomed, cylindrical retaining cylinder 52 at the center portion in the valve housing 41. A columnar center post (fixed core) 53 is securely fitted into the upper opening of the retaining cylinder 52. The fitting of the center post 53 defines a plunger chamber 54 at the bottommost portion in the retaining cylinder 52.

A cylindrical plunger (movable core) 56, is retained in the plunger chamber 54 in such a way as to be movable in the axial direction. A guide hole 57 extending in the axial direction of the center post 53 is bored through the center of the center post 53. The lower end portion of the rod 45 is placed in the guide hole 57 in such a way as to be movable in the axial direction. The lower end portion of the rod 45 abuts on the upper end portion of the plunger 56 in the plunger chamber 54.

A spring 60 is retained between the inner bottom of the retaining cylinder 52 and the plunger 56 in the plunger chamber 54. The spring 60 urges the plunger 56 toward the rod 45. The rod 45 is urged toward the plunger 56, based on the spring characteristic of the bellows 48. Therefore, the plunger 56 and the rod 45 always move up and down together. The spring force of the bellows 48 is greater than the urging force of the spring 60.

A coil 61 is wound around the retaining cylinder 52 over a portion extending from the center post 53 to the plunger 56. The coil 61 is supplied with power from a drive circuit 71.

Electromagnetic force, which varies according to the amount of power supplied to the coil 61 from the drive circuit 71, is generated between the plunger 56 and the center post 53. The electromagnetic force is transmitted to the rod 45 via the plunger 56.

The energization of the coil 61 is controlled by adjusting the applied voltage, which is adjusted by PWM (Pulse Width Modulation) control.

The position of the rod 45 (valve body 46) placed in the control valve CV or the degree of valve opening is determined in the following manner.

When the coil 61 is not energized (the duty ratio=0%), as shown in FIG. 2, the action of the downward urging force of the bellows 48 is dominant on the arrangement of the rod 45. Therefore, the rod 45 is placed at the lowest movable position and the valve body 46 fully opens the communication passage 43. As a result, the inner pressure of the crank chamber 12 takes the maximum value possible under the circumstance at that time. The difference between the inner pressure of the crank chamber 12 and the inner pressure of the compression chamber 20 is large so that the swash plate 15 has the minimum inclination angle, thus minimizing the discharge capacity of the compressor.

When energization of the minimum duty ratio (>0%) or greater is applied to the coil 61 of the control valve CV, the upward electromagnetic force added to the urging spring force of plunger-urging spring 60 surpasses the downward urging force produced by the bellows 48, so that the rod starts moving upward. In this state, the upward electromagnetic force added by the upward urging force of the spring 60 acts against the downward pressure based on a differential pressure ΔPd (=PdH−PdL) between the two points that is added by the downward urging force of the bellows 48. The valve body 46 of the rod 45 is positioned at the position where those upward and downward urging forces balance with each other.

When the rotational speed of the engine E decreases, thus reducing the amount of the refrigerant in the refrigerant circulation circuit, for example, the force based on the differential pressure ΔPd becomes smaller and the electromagnetic force at that time cannot realize the balance of the upward and downward urging forces acting on the rod 45. As a result, the rod 45 (valve body 46) moves upward, decreasing the degree of opening of the communication passage 43, so that the inner pressure of the crank chamber 12 tends to decrease. Therefore, the swash plate 15 tilts in the direction of increasing the inclination angle, which increases the discharge capacity of the compressor. The increase in the discharge capacity of the compressor increases the amount of the refrigerant in the refrigerant circulation circuit, which raises the differential pressure ΔPd.

When the rotational speed of the engine E increases, thus increasing the amount of the refrigerant in the refrigerant circulation circuit, on the other hand, the force based on the differential pressure ΔPd becomes greater and the electromagnetic force at that time cannot realize the balance of the upward and downward urging forces acting on the rod 45. As a result, the rod 45 (valve body 46) moves downward, increasing the degree of opening of the communication passage 43, so that the inner pressure of the crank chamber 12 tends to increase. Therefore, the swash plate 15 tilts in the direction of decreasing the inclination angle, which reduces the discharge capacity of the compressor. The reduction in the discharge capacity of the compressor decreases the amount of the refrigerant in the refrigerant circulation circuit, which lowers the differential pressure ΔPd.

When the upward electromagnetic force is increased by increasing the duty ratio of energization to the coil 61, for example, the force based on the then differential pressure ΔPd cannot achieve the balance of the upward and downward urging forces. As a result, the valve body 46 moves upward, thus decreasing the degree of opening of the communication passage 43. This increases the discharge capacity of the compressor. Consequently, the amount of the refrigerant in the refrigerant circulation circuit increases, thus increasing the differential pressure ΔPd between the two points.

When the upward electromagnetic force is reduced by decreasing the duty ratio of energization to the coil 61, the force based on the then differential pressure ΔPd cannot achieve the balance of the upward and downward urging forces. As a result, the valve body 46 moves downward, thus increasing the degree of opening of the communication passage 43. This decreases the discharge capacity of the compressor. Consequently, the amount of the refrigerant in the refrigerant circulation circuit decreases, thus reducing the differential pressure ΔPd.

The control valve CV is constructed to position the rod 45 (valve body 46) internally in an autonomous fashion in accordance with a change in differential pressure ΔPd in such a way as to keep the control theoretical (or target value) of the differential pressure ΔPd that is determined by the duty ratio of energization to the coil 61. The set differential pressure can be externally changed by an external instruction adjusting the duty ratio of energization to the coil 61.

As shown in FIG. 2, a first ECU 81 which performs the general control of the air-conditioning system and a second ECU 82 which performs the general control of the engine E are installed in the vehicle. Each of the ECUs 81 and 82 is an electronic control unit incorporating a computer. The first ECU 81 and the second ECU 82 are connected together in such a way as to be able to communicate with each other.

The first ECU 81 is connected with an A/C switch 83 (the ON/OFF switch of the air-conditioning system that is operated by a passenger), a temperature setting unit 84 for setting a preferable temperature in the vehicle's cabin, a temperature sensor 85 for sensing the temperature in the vehicle's cabin, a first pressure sensor for detecting pressure in a first predetermined region of the refrigerant circulation circuit (e.g., Pd sensor 86 for detecting a pressure Pd in a discharge pressure area between the discharge chamber 22 of the compressor and the condenser 31 inclusive in the refrigerant circulation circuit), and a second pressure sensor for detecting pressure in a second predetermined region of the refregerant circulation circuit (e.g., Ps sensor 87 for detecting a pressure Ps in an suction pressure area between the evaporator 33 and the suction chamber 21 of the compressor inclusive in the refrigerant circulation circuit). The first ECU 81 is also connected with the drive circuit 71 or the control valve CV (coil 61) as a control element.

The second ECU 82 is connected with an acceleration angle sensor 88 for detecting an acceleration angle (the amount of depression of the acceleration pedal) and a rotational speed sensor 89 for detecting a rotational speed Ne of the engine E. An electronic control type throttle valve unit 75 equipped in the engine E is connected to the second ECU 82 as a control element.

The first ECU 81 computes the duty ratio based on information from the sensors (information detecting means) 83 to 85 for air-conditioning (such as ON/OFF information of the air-conditioning system, information on the temperature in the vehicle's cabin and information on the set temperature), and instructs the drive circuit 71 to drive the control valve CV (coil 61) at that duty ratio.

The first ECU 81 computes (estimates) a compressor torque Tr needed to drive the compressor from the following equation (1) based on information from the sensors (information detecting means) 86, 87 and 89 for computation of the compressor torque (such as the discharge pressure Pd, the suction pressure Ps, the rotational speed Ne and the duty ratio for driving the control valve CV). The first ECU 81 sends the compressor torque information Tr to the second ECU 82.

$$Tr = (\text{theoretical torque}) / (\text{operational efficiency}) = \qquad (1)$$

$$\frac{60}{2\pi Nc} \left[ \frac{n}{n-1} Pd \times Qd \times \left\{ 1 - \left(\frac{Pd}{Ps}\right)^{\frac{1-n}{n}} \right\} \right] / \eta ad$$

where n is the ratio of specific heat (1.03 in case of R134a), Nc is the rotational speed (rpm) of the compressor (drive shaft 13), Qd is the flow rate of the refrigerant in the discharge gas state, Pd is the discharge pressure and Ps is the suction pressure.

The rotational speed Nc of the drive shaft 13 is computed based on a prestored pulley ratio (gear ratio) in the power transmission path between the engine E and the drive shaft 13 in addition to the rotational speed information Ne of the engine E received from the second ECU 82. That is, the rotational speed sensor 89 serves as the rotational speed detecting means that detects the physical quantity Ne that has a correlation with the rotational speed Nc of the drive shaft 13.

The refrigerant flow rate Qd is given by (flow rate coefficient)×(the area of the fixed restrictor (37))×√(2ΔPd/Pd). The differential pressure ΔPd between two points is determined by the function of the value of an input current to the coil 61 of the control valve CV (which is known from the duty ratio and the voltage of the power supply (battery) and the valve characteristic. A relative density Pd of the discharge gas can be approximated by the discharge pressure Pd. That is, the first ECU 81 that determines the differential pressure ΔPd between two points serves as the refrigerant flow rate detecting means and can grasp the refrigerant flow rate Qd from the duty ratio that is instructed to the drive circuit 71.

The operational efficiency ηad is computed by using an equation (2) given below.

$$\eta ad = 1 - \frac{A \cdot Nc}{(B \cdot Qd)^c + A \cdot Nc} \tag{2}$$

where A, B and C are constants previously acquired through experiments or the like.

According to the present embodiment, the compressor torque Tr needed to actually drive the compressor is computed (estimated) based on the current operational efficiency ηad in addition to the theoretical torque that is theoretically needed for the current driving of the compressor (ideal adiabatic compression).

The second ECU 82 computes the target engine output torque from information, such as the acceleration angle information from the acceleration angle sensor 88, the rotational speed information Ne from the rotational speed sensor 89 and the compressor torque information Tr received from the first ECU 81. The second ECU 82 adjusts the amount of suction air to the engine E by operating the throttle valve unit 75 based on the computed target engine output torque.

According to the present invention, as described above, the theoretical torque and the operational efficiency ηad of the compressor are computed based on the operational state of the compressor and the compressor torque Tr is computed (estimated) based on the theoretical torque and operational efficiency ηad. This improves the precision of the compressor torque information Tr so that the power control of the engine E further in consideration of the compressor torque information Tr can be carried out accurately. This leads to reduction in fuel consumption of the vehicle and an improvement of the operational feeling.

The control valve CV is constructed to regulate the discharge capacity of the compressor internally in an autonomous fashion in accordance with a change in differential pressure ΔPd in such a way as to keep the set differential pressure that is determined by the duty ratio of energization to the coil 61. The differential pressure ΔPd reflects the refrigerant flow rate Qd. Therefore, the first ECU 81 easily grasps the refrigerant flow rate Qd of the refrigerant circulation circuit from the duty ratio for controlling the energization of the control valve CV, and can be said to incorporate the refrigerant flow rate detecting means.

That is, the control valve CV (which is of the type that varies the set differential pressure) according to the present embodiment is designed suitable for the first ECU 81 to grasp the refrigerant flow rate Qd. The embodiment can therefore simplify the electric structure and reduce the computational load of the first ECU 81 as compared with the control valve of the type that varies the set suction pressure or the set discharge pressure, which need exclusive sensors to be described later.

The first ECU 81 computes the operational efficiency Lad of the compressor using elements (the refrigerant flow rate Qd and rotational speed Nc) which significantly influence the operational efficiency ηad as parameters. This increases the accuracy of computing the operational efficiency ηad and thus the accuracy of computing the compressor torque Tr.

The present invention can be worked out as follows without departing from the scope of the present invention.

The rotational speed Nc alone is used as a parameter in computing the operational efficiency ηad. That is, the operational efficiency ηad is calculated by using, for example, an equation (3) given below. This can relieve the computation load of the first ECU 81.

$$\eta ad = 1 - A \cdot Nc \tag{3}$$

The refrigerant flow rate Qd alone is used as a parameter in computing the operational efficiency ηad. This can reduce the computation load of the first ECU 81.

Even if the suction pressure Ps in the equation (1) of computing the compressor torque Tr is set constant, the compressor torque Tr can be computed with an accuracy high enough to be practically acceptable. This can eliminate the Ps sensor 87 to simplify the electric structure and reduce the computation load of the first ECU 81 for the following reason. Even if the suction pressure Ps varies, the change does not affect the compressor torque Tr as much as the discharge pressure Pd or the refrigerant flow rate Qd.

Further, the structure may be modified so that the first ECU 81 itself has a sensor that directly detects the rotational speed Nc of the compressor (drive shaft 13). This design eliminates a delay of the rotational speed information originated from the speed of communication between the first ECU 81 and the second ECU 82. This increases the real-time acquisition of the rotational speed information, thus making it possible to calculate the compressor torque Tr with a higher precision.

The second ECU 82 may compute the compressor torque Tr. In this case, the second ECU 82 may receive the operational information of the compressor (the discharge pressure Pd, the suction pressure Ps and the duty ratio that is instructed to the drive circuit 71) from the first ECU 81. Further, the first ECU 81 may be eliminated and the second ECU 82 may be designed to also serve as the ECU 81.

The second ECU 82 may control an ISCV (Idle Speed Control Valve) unit based on the compressor torque information Tr from the first ECU 81. This design stabilizes the idling of the engine E.

The transmission pattern of an automatic transmission of a vehicle may be changed based on the compressor torque information Tr. In other words, the compressor torque information Tr can be used to control the power transmission system from the engine E to the drive wheels.

The first pressure monitor point P1 may be set in an suction pressure area between the evaporator 33 and the suction chamber 21 inclusive, and the second pressure monitor point P2 may be set in the same suction pressure area at the downstream of the first pressure monitor point P1. Even in this case, the refrigerant flow rate Qd is reflected on the differential pressure between the two pressure monitor points P1 and P2, thus providing the same advantage as the that descdribed in page 11, line 24 to. Page 12, line 4.

Alternatively, the first pressure monitor point P1 may be set in a discharge pressure area between the discharge chamber 22 and the condenser 31 inclusive, and the second pressure monitor point P2 may be set in an suction pressure area.

The first pressure monitor point P1 may be set in the discharge pressure area, and the second pressure monitor point P2 in the crank chamber 12. Alternatively, the second pressure monitor point P2 in the crank chamber 12, and the first pressure monitor point P1 in the suction pressure area. That is, the pressure monitor points P1 and P2 are set in the refrigeration cycle (the external refrigeration circuit 30 (evaporator 33)→suction chamber 21→compression chamber 20→discharge chamber 22→external refrigeration circuit 30 (condenser 31) as in the above embodiment. Further, the areas where the pressure monitor points P1 and P2 are set are not limited to the high pressure area and/or the low pressure area of the refrigeration cycle, but the pressure monitor points P1 and P2 may be set in the crank chamber 12 as an intermediate pressure area that constitutes a refrigerant circuit for displacement control (the air-supply passage 28→crank chamber 12→bleeding passage 27) which is considered as a sub circuit of the refrigerant circulation circuit.

The control valve CV may be changed to the type that varies the suction pressure or the type that varies the set discharge pressure. The control valve CV is designed in such a way as to be able to mechanically detect the suction pressure (former) or the discharge pressure (latter) and operate the valve body in an internal autonomous fashion so that the discharge capacity of the compressor is changed in the direction of canceling a change in the detected pressure and, and to change the set suction pressure (former) or the set discharge pressure (latter) which is a reference for the operation of positioning the valve body under external control.

The control valve CV may be changed to a so-called bleed-side control valve which regulates the inner pressure of the crank chamber 12 by adjusting the degree of opening of the bleeding passage 27, not the air-supply passage 28.

The present invention may be embodied into an air-conditioning system equipped with a wobble type variable displacement swash plate type compressor.

The present invention may also be embodied into an air-conditioning system equipped with a fixed displacement type compressor.

The present invention may be embodied into a rotary type compressor, such as a scroll type compressor, besides a piston type compressor.

What is claimed is:

1. An air conditioning apparatus comprising:
   a refrigerant circulation circuit that has a compressor;
   a first detector for detecting a driving status of the compressor;
   a first calculator for calculating a theoretical torque and a driving efficiency of the compressor based on information from the first detecting means; and
   a second calculator for calculating a necessary torque required for driving the compressor, said second calculating means calculating the necessary torque based on the theoretical torque and the driving efficiency.

2. An air conditioning apparatus as set forth in claim 1, further comprising:
   a second detector means for detecting a flow rate in the coolant circuit, wherein said first calculating means calculates the driving efficiency based on the detected flow rate.

3. An apparatus as set forth in claim 2, further comprising a control valve which includes:
   a valve body for adjusting the degree of opening of a control passage;
   a mechanism that detects a differential pressure between two points selected in the coolant circuit and adjustably move the valve body according to external instruction to maintain the differential pressure at a target value;
   an actuator for changing the theoretical value of the differential pressure based on an external instruction.

4. An apparatus as set forth in claim 3, wherein said second detector detects the flow rate in the coolant circuit based on the external instruction.

5. An apparatus as set forth in claim 3, further comprising a swash plate disposed in the control chamber, said swash plate being variably inclined according to the inner pressure of the control chamber, wherein the displacement of the compressor changes based on an inclination angle of the swash plate.

6. An air conditioning apparatus as set forth in claim 1, wherein said apparatus is used for a vehicle having a vehicle cabin and, wherein a vehicle engine is used as a driving source of the compressor.

7. An air conditioning apparatus as set forth in claim 6, wherein said air conditioning apparatus further comprises a switch for turning off and on the compressor, a temperature setting unit for setting a temperature of the vehicle cabin, a temperature sensor for detecting the temperature of the vehicle cabin, a first pressure sensor for detecting pressure in a first predetermined region of the coolant circuit and a second pressure sensor for detecting pressure in a second predetermined region of the coolant circuit.

8. An apparatus for controlling an engine that is a driving source of a vehicle and an air conditioner mounted on the vehicle, wherein said air conditioner has a compressor, said apparatus comprising:
   a first detector for detecting a driving status of the compressor;
   a first calculator for calculating a theoretical torque and a driving efficiency of the compressor based on information from the first detecting means;
   a second calculating means for calculating a necessary torque required for driving the compressor, said second calculating means calculating the necessary torque based on the theoretical torque and the driving efficiency; and
   a controller controlling the engine reflecting the torque calculated by the second calculator.

9. A method for calculating a torque of a compressor included in a coolant circuit comprising steps of:
   detecting a driving status of the compressor;
   calculating a theoretical torque and a driving efficiency of the compressor based on the detected driving status; and
   computing a torque that is required for driving the compressor in accordance with the theoretical torque and the driving efficiency.

10. A method as set forth in claim 9, further comprising:
    a step of detecting a flow rate in the refrigerant circulation circuit.

* * * * *